(12) United States Patent
Tsai

(10) Patent No.: US 9,335,849 B2
(45) Date of Patent: *May 10, 2016

(54) VISUAL INTERFACE SYSTEM

(76) Inventor: Hsiung-Kuang Tsai, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/344,596

(22) PCT Filed: Jul. 10, 2012

(86) PCT No.: PCT/CN2012/078412
§ 371 (c)(1),
(2), (4) Date: Mar. 12, 2014

(87) PCT Pub. No.: WO2013/037238
PCT Pub. Date: Mar. 21, 2013

(65) Prior Publication Data
US 2014/0340357 A1 Nov. 20, 2014

(30) Foreign Application Priority Data

Sep. 13, 2011 (WO) .............. PCT/CN2011/079576

(51) Int. Cl.
*G06F 3/045* (2006.01)
*G06F 3/041* (2006.01)
*G06F 3/044* (2006.01)
*H04B 5/00* (2006.01)
*H04W 4/00* (2009.01)

(52) U.S. Cl.
CPC .............. *G06F 3/041* (2013.01); *G06F 3/044* (2013.01); *G06F 3/0412* (2013.01); *G06F 3/0416* (2013.01); *H04B 5/0031* (2013.01); *H04W 4/008* (2013.01); *G06F 2203/04101* (2013.01)

(58) Field of Classification Search
CPC . G06F 3/0354; G06F 3/03545; G06F 3/0383; G06F 3/0412; G06F 3/044; G06F 3/041; G06F 2203/04101; G06F 3/0416; H04B 5/0031; H04W 4/008
USPC ........................................................ 345/179
See application file for complete search history.

(56) References Cited

U.S. PATENT DOCUMENTS

| 4,841,290 A * | 6/1989 | Nakano et al. ................ 345/179 |
| 7,777,719 B2 * | 8/2010 | Zhao ............................. 345/156 |
| 2004/0262051 A1 | 12/2004 | Carro |
| 2011/0007037 A1 * | 1/2011 | Ogawa .......................... 345/179 |
| 2011/0109568 A1 | 5/2011 | Wu et al. |
| 2011/0298421 A1 * | 12/2011 | Palay et al. ................... 320/108 |

FOREIGN PATENT DOCUMENTS

| CN | 1829314 A | 9/2006 |
| CN | 101419520 A | 4/2009 |

(Continued)

*Primary Examiner* — Charles Hicks
(74) *Attorney, Agent, or Firm* — Cheng-Ju Chiang

(57) ABSTRACT

A visual interface system includes an operation apparatus and a passive matrix display apparatus. The passive matrix display apparatus includes a first substrate, a display surface and a second substrate. The display surface is located at a first side of the first substrate, and the second substrate is disposed opposite to the first substrate and located at a second side of the first substrate relatively opposite to the first side. When the operation apparatus is operated on the display surface of the passive matrix display apparatus, an encoded signal is coupled to the operation apparatus from the passive matrix substrate. The operation apparatus receives the encoded signal to obtain a transmission signal. The visual interface system can achieve the touch input function without configuring an additional touch panel, and is equipped with the near field communication (NFC) function.

16 Claims, 6 Drawing Sheets

(56) References Cited

FOREIGN PATENT DOCUMENTS

| CN | 101943978 A | 1/2011 |
| CN | 102073409 | 5/2011 |
| CN | 201828896 U | 5/2011 |
| JP | 6-318136 A | 11/1994 |
| JP | 2000-322199 A | 11/2000 |
| JP | 2004-5415 A | 1/2004 |
| JP | 2006-127190 A | 5/2006 |

* cited by examiner

VISUAL INTERFACE SYSTEM

CROSS REFERENCE TO RELATED APPLICATIONS

The present application is a 35 U.S.C. §371 National Phase conversion of International (PCT) Patent Application No. PCT/CN2012/078412, filed on Jul. 10, 2012, the disclosure of which is incorporated by reference herein. The PCT International Patent Application was filed and published in Chinese.

BACKGROUND OF THE INVENTION

1. Field of Invention

The present invention relates to a human-machine interface system and, in particular, to a visual interface system.

2. Related Art

Recently, touch panels have been widely applied to the commercial electronic products such as smart phones, digital cameras, MP3, PDA, GPS, tablet PC, UMPC, and the likes. In these electronic products, the touch panel is bound with a screen to form a touch input display apparatus.

In order to broaden the application field of the commercial electronic products, some products have been added with the new function of near field communication (NFC), which can be used to replace the conventional IC card (e.g. door card, credit card, ticket, and etc.), exchange information (e.g. music, image, name card, and etc.) between two electronic devices, or the likes. Accordingly, it is desired to create a product with a simple structure and more functions.

Therefore, it is an important subject to provide a visual interface system which can achieve the desired touch input function without configuring an additional touch panel, thereby making the product lighter and thinner, lowering the production cost, and providing the NFC function for broadening the application field.

SUMMARY OF THE INVENTION

An objective of the present invention is to provide a visual interface system that can achieve the touch input function without configuring an additional touch panel, and is equipped with a near field communication (NFC) function.

The present invention can be implemented by the following technical proposals.

A visual interface system of the invention includes an operation apparatus and a passive matrix display apparatus. The passive matrix display apparatus includes a first substrate, a display surface and a second substrate. The display surface is located at a first side of the first substrate. The second substrate is disposed opposite to the first substrate and located at a second side of the first substrate relatively opposite to the first side. When the operation apparatus is operated on the display surface of the passive matrix display apparatus, an encoded signal is coupled to the operation apparatus from the passive matrix substrate, and the operation apparatus receives the encoded signal to obtain a transmission signal.

In one embodiment, the transmission signal is transmitted to the passive matrix display apparatus.

In one embodiment, the passive matrix display apparatus has at least an electrode disposed on the first substrate or the second substrate, and the encoded signal is applied to the electrode and is then capacitive or inductive coupled to the operation apparatus from the electrode. The electrode is a separate electrode or one of a plurality of electrodes of the passive matrix display apparatus.

In one embodiment, the passive matrix display apparatus processes the transmission signal to obtain information comprising touch input information, instruction information, identification information, transaction information, or file information. Herein, the touch input information includes relative position information of the operation apparatus on the display surface.

In one embodiment, the visual interface system further includes at least a relay apparatus for processing the transmission signal to generate a relay processed signal. The relay processed signal can be transmitted to the passive matrix display apparatus or other apparatuses outside the visual interface system. The transmission signal includes touch input information, instruction information, identification information, transaction information, file information or other information. The relay processed signal comprises touch input information, instruction information, identification information, transaction information, file information or other information. Alternatively, the passive matrix display apparatus or another apparatus outside the visual interface system processes the relay processed signal to obtain information including touch input information, instruction information, identification information, transaction information, file information or other information.

In one embodiment, the visual interface system further includes a mode trigger device for enabling the passive matrix display apparatus into an operating mode to output the encoded signal as the mode trigger device is triggered by a user or the operation apparatus.

In one embodiment, when the operation apparatus is a user, the visual interface system further includes a sensing device, and then when the user touches the display surface and the sensing device simultaneously, the transmission signal is transmitted to the sensing device. Herein, the sensing device has a mode trigger function, so the sensing device enables the passive matrix display apparatus into an operating mode to output the encoded signal as the user touches the sensing device.

In one embodiment, the passive matrix display apparatus further includes a display medium layer disposed between the first substrate and the second substrate. In addition, the passive matrix display apparatus further includes a plurality of column electrodes disposed at the second side of the first substrate and a plurality of row electrodes disposed at one side of the second substrate facing the first substrate. Herein the column electrodes and the row electrodes are intersected.

In the visual interface system of the invention, when the operation apparatus is operated on the display surface of the passive matrix display apparatus, the encoded signal is coupled to the operation apparatus from the passive matrix display apparatus, and the operation apparatus receives the encoded signal to generate a transmission signal. In the touch input operation, the transmission signal can be directly or indirectly transmitted to the passive matrix display apparatus. During this transmission procedure, the transmission signal can be processed by the operation apparatus, and/or at least one relay apparatus, and/or the passive matrix display apparatus, so that the passive matrix display apparatus can retrieve the information (e.g. touch input information, instruction information, identification information, transaction information, file information or other information) contained in the encoded signal and transmission signal.

As mentioned above, the visual interface system of the invention can be directly applied to the system containing the passive matrix structure such as passive matrix LCD apparatus, non-volatile type display apparatus, touch input display apparatus, passive matrix OLED display apparatus, or the likes, thereby integrating display, touch input and data transmission functions together. Thus, the manufactured products can be lighter and thinner and the product cost can be decreased, thereby improving the product competitiveness. Moreover, the encoded signal is coupled to the external operation apparatus instead of being directly read by the passive matrix display apparatus, so that it is unnecessary to modify the layout on the passive matrix display apparatus. For example, regarding the touch input application, it is unnecessary to add the capacitance sensing components in the display panel for detecting the change of external capacitance values. As a result, the present invention can decrease the manufacturing cost and shrink the process time.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
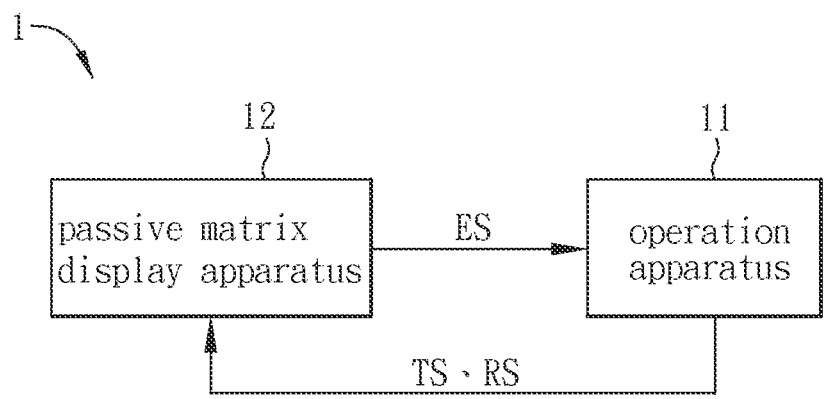
FIG. 1 is a block diagram of a visual interface system according to a first embodiment of the invention.

FIG. 1 is a block diagram of a visual interface system 1 according to a first embodiment of the invention.

With reference to FIG. 1, the visual interface system 1 includes an operation apparatus 11 and a passive matrix display apparatus 12 coupled with each other by, for example, capacitive or inductive coupling for transmitting signals. Thus, the signal transmission between the operation apparatus 11 and the passive matrix display apparatus 12 is a non-contact signal transmission (wireless).

In this embodiment, the operation apparatus 11 is, for example, a stylus, a conductor, an IC card, an NFC reading apparatus, or a user (especially the finger of a user). When the operation apparatus 11 is an electronic apparatus, it may include some functional circuits such as a process control circuit, a storage circuit or a transmission circuit. Herein, any circuit can be composed of hardware, software or firmware, or their combinations. When the operation apparatus 11 is a user, the user (operation apparatus) can serve as a conductor for transmitting signals. Besides, the passive matrix display apparatus 12 can be, for example, a passive matrix LCD, a touch input display apparatus, a non-volatile type display apparatus, or a passive matrix OLED display apparatus.

Figure 2:
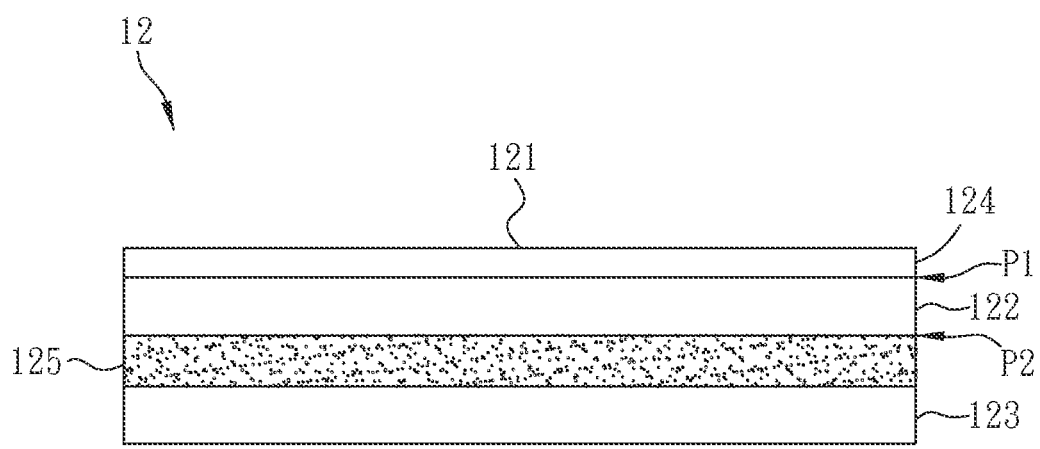
FIG. 2 is a side view of a passive matrix display apparatus according to the first embodiment of the invention.

FIG. 2 is a side view of the passive matrix display apparatus 12 of FIG. 1.

Referring to FIG. 2, the passive matrix display apparatus 12 includes a display surface 121, a first substrate 122 and a second substrate 123. The display surface 121 is located at a first side P1 of the first substrate 122. The second substrate 123 is disposed opposite to the first substrate 122 and located at a second side P2 of the first substrate 122 relatively opposite to the first side P1. In this embodiment, the display surface 121 is the surface of the passive matrix display apparatus 12, which is closest to the viewer when the viewer is watching the images displayed on the passive matrix display apparatus 12. Besides, the first substrate 122 and the second substrate 123 can be glass substrates. The passive matrix display apparatus 12 may further include a protect glass 124 disposed on the first side P1 of the first substrate 122. In this case, the display surface 121 is the surface of the protect glass 124 closest to the viewer.

In addition, the passive matrix display apparatus 12 may further include a display medium layer 125 disposed between the first substrate 122 and the second substrate 123. When the passive matrix display apparatus 12 is an LCD apparatus, the display medium layer 125 is a liquid crystal layer. Besides, the LCD apparatus further includes alignment layers, polarizer, color filter layer, backlight or other components. Or, when the passive matrix display apparatus 12 is a non-volatile type display apparatus, the display medium layer 125 can be an electrophoretic layer. Besides, the non-volatile type display apparatus may further include other components such as an accommodating structure. Alternatively, when the passive matrix display apparatus 12 is an OLED display apparatus, the display medium layer 125 is an organic light emitting layer. In this case, the passive matrix display apparatus 12 may further include other components such as a color filter layer.

The implementation of the embodiment used in the touch input purpose will be described hereinafter. Referring to FIGS. 1 and 2, when the operation apparatus 11 is operated on the display surface 121 of the passive matrix display apparatus 12, an encoded signal ES is wirelessly coupled to the operation apparatus 11 (by capacitive or inductive coupling) from the passive matrix display apparatus 12, and the operation apparatus 11 receives the encoded signal ES so as to generate a transmission signal TS. Herein, the encoded signal ES contains the coordinate of the touch position of the operation apparatus 11 on the display screen of the passive matrix display apparatus 12, and the transmission signal TS contains the coordinate information. When the encoded signal ES is transmitted form the passive matrix display apparatus 12 to the operation apparatus 11, they are wirelessly transmitted so as to form a near field signal transmission. Of course, in other applications, the encoded signal ES can be composed of any information to be transmitted such as touch input information, instruction information, identification information, transaction information, or file information (e.g. music, images, texts, and etc.), so that the transmission signal TS contains the corresponding information. The encoded signal ES can be applied to at least one electrode on the passive matrix display apparatus 12. This electrode can be disposed on the first substrate 122 or the second substrate 123. The encoded signal ES is applied to this electrode and then capacitively or inductively coupled to the operation apparatus 11 through the electrode. Besides, additional display data signal are applied to the passive matrix display apparatus 12 for displaying images. The encoded signal ES can be applied during the blanking time of the display signals. For example, the encoded signal ES can be applied between two frames or between the signal transmissions of two row or column electrodes, or during the period generated by shortening the duration of the display signals, or the encoded signal ES can have a higher frequency and be directly added to the display signal, or it can be applied between the renewals of the display screen.

Figure 3A:
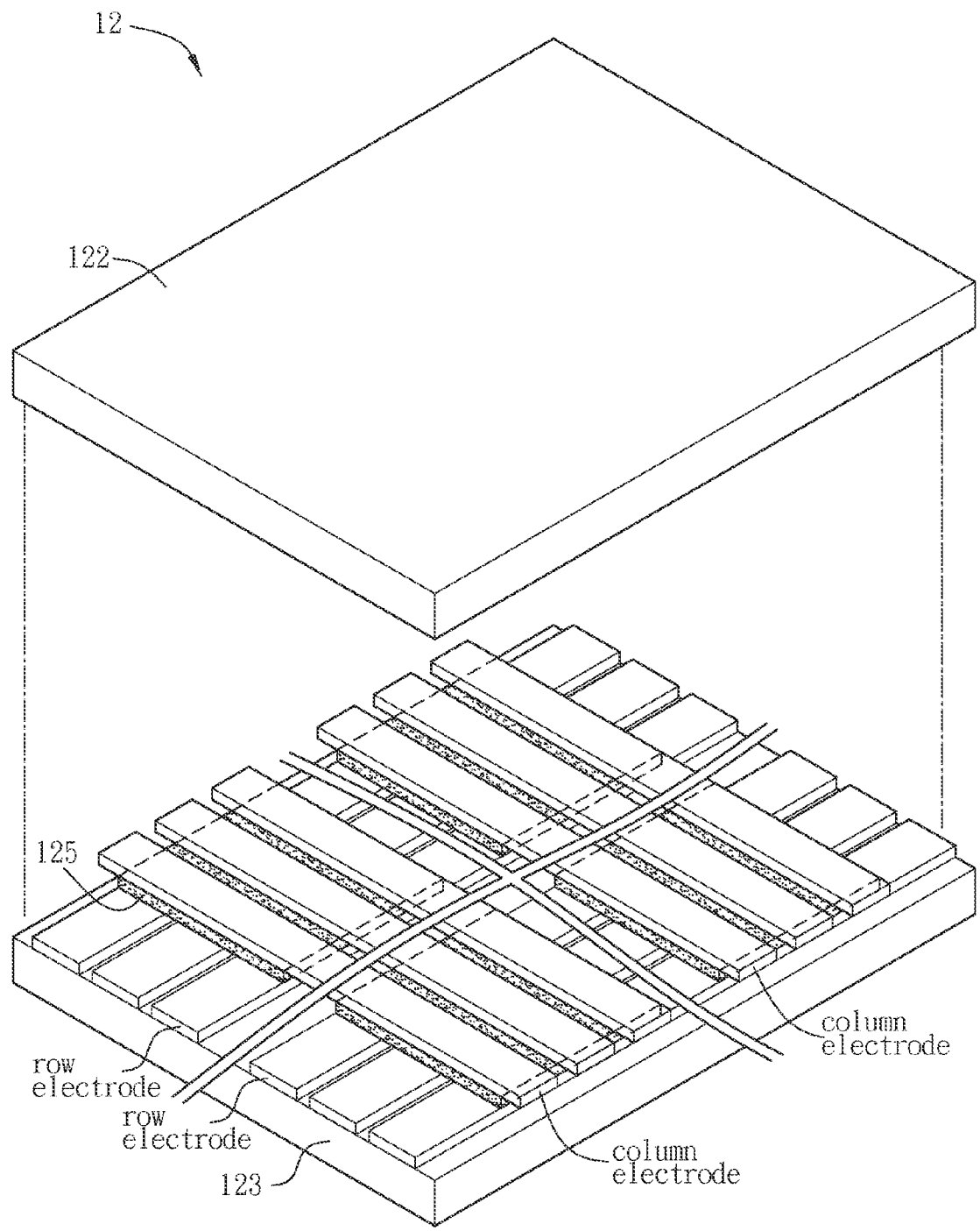
FIG. 3A is a perspective diagram showing a passive matrix display apparatus of FIG. 2.
Figure 3B:
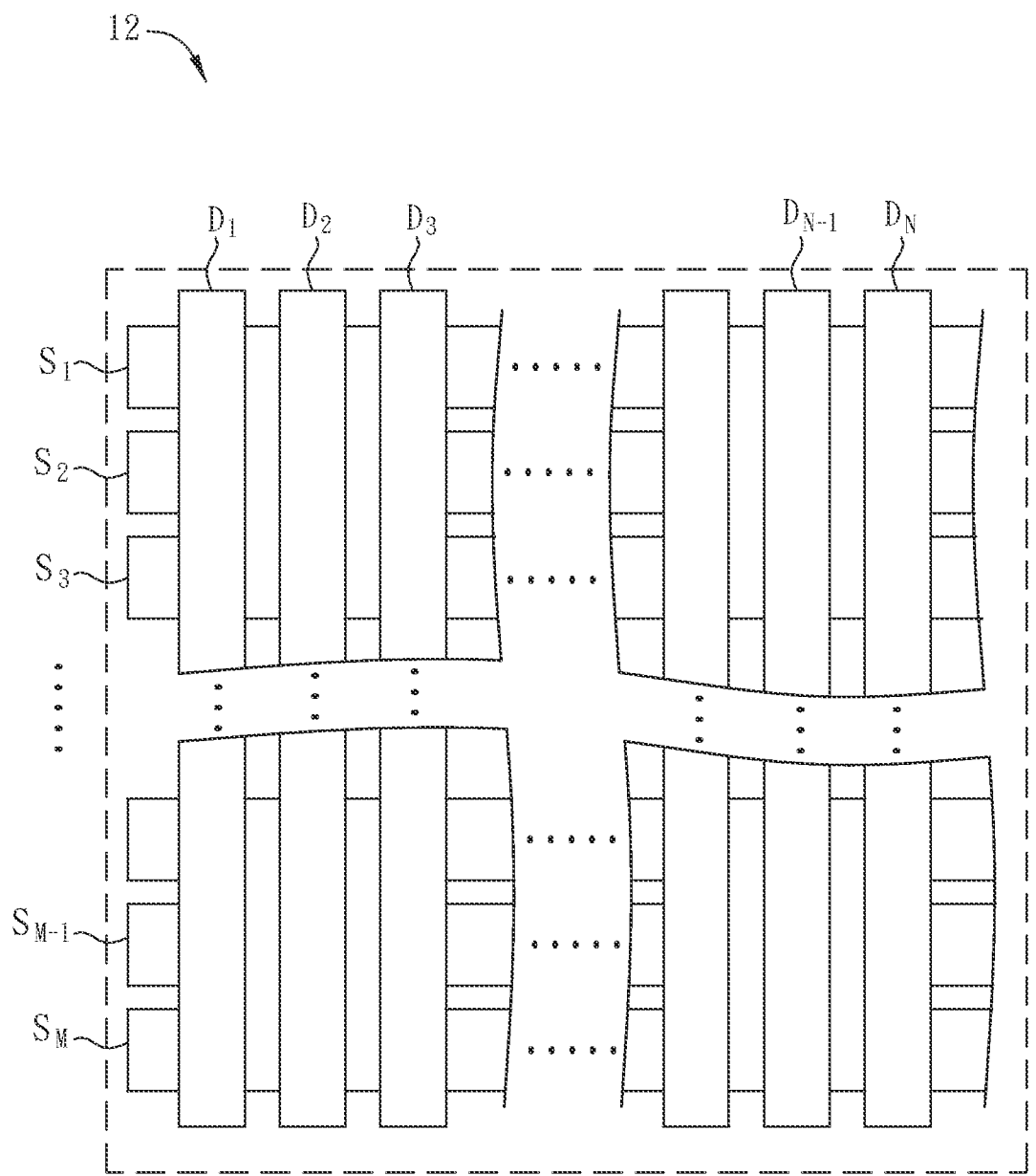
FIG. 3B is a schematic diagram showing the intersected column electrodes and row electrodes of FIG. 3A.

FIG. 3A is a perspective diagram showing the passive matrix display apparatus 12 of FIG. 2, and FIG. 3B is a schematic diagram showing the intersected column electrodes and row electrodes of FIG. 3A. To be noted, FIG. 3B only shows the column electrodes and the row electrodes of the passive matrix display apparatus 12 of FIG. 3A, while the first substrate 122, the second substrate 123 and the display medium layer 125 of the passive matrix display apparatus 12 are not shown in FIG. 3B.

In this embodiment, the passive matrix display apparatus 12 is an OLED display apparatus for example, and the display medium layer 125 is an organic light emitting layer. Referring to FIGS. 2, 3A and 3B, the passive matrix display apparatus 12 further includes a plurality of column electrodes $D_1 \sim D_N$ and a plurality of row electrodes $S_1 \sim S_M$. The column electrodes $D_1 \sim D_N$ are disposed at the second side P2 of the first substrate 122, while the row electrodes $S_1 \sim S_M$ are disposed at one side of the second substrate 123 facing the first substrate 122. The column electrodes $D_1 \sim D_N$ and the row electrodes $S_1 \sim S_M$ are intersected, and they are substantially perpendicular to each other or have an included angle. Moreover, the passive matrix display apparatus 12 further includes a driving module (not shown) for driving the passive matrix display apparatus 12 to display image. In practice, the driving module can drive the selected row and column electrodes for lighting the display medium layer 125 located at the cross of the row and column electrodes so as to display image. Since the driving method of the driving module and the passive matrix display apparatus 12 is a well-known conventional technology, the detailed description thereof will be omitted here. The point of this embodiment is in that the column electrodes $D_1 \sim D_N$ and/or the row electrodes $S_1 \sim S_M$ transmit the encoded signal ES from the passive matrix display apparatus 12 to the operation apparatus 11 so as to generate the transmission signal TS. The encoded signal may carry various information for different applications, such as, the reference coordinates of the display screen of the passive matrix display apparatus 12, the file information of different formats (e.g. personal data, music, images, and etc.), and the likes.

In this embodiment, the column electrodes $D_1 \sim D_N$ can transmit not only the data signals for displaying images but also the encoded signal ES. For example, the encoded signal ES with higher frequency can be directly added to the display signal DS or be added to the blank period of the display signal DS such as the period between two frames or the blank time between the renewals of the screen. Herein, the encoded signal ES can be provided by the circuit of the driving module of the passive matrix display apparatus 12, thereby simplifying the circuit design.

To be noted, when the passive matrix display apparatus 12 is a bistable display apparatus such as a cholesteric LCD apparatus, the display apparatus needs the display signals only for the screen renewal, so that the encoded signal can be transmitted during the display screen renewal (carried on the display signal) or between the renewals of the display screen (between display signals). Moreover, the passive matrix display apparatus 12 can renew a part of the display screen only, so that the encoded signal can be transmitted along with the renewal of the part of the display screen or between the renewals of the part of the display screen. Or, the passive matrix display apparatus 12 can be a quasi-bistable display apparatus such as an IMOD (interferometric modulator) display apparatus using MEMS to generate light interference. In addition to the display signal for renewing screen, this kind of display apparatus needs a sustaining signal to maintain the screen image even the screen is not renewed. In this case, the encoded signal can be carried on the display signal or the sustaining signal, or between the display signals or sustaining signals.

Figure 4:
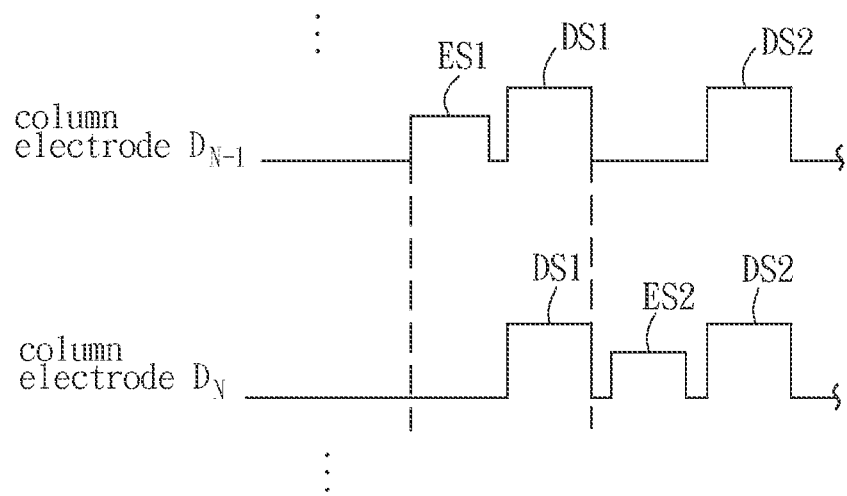
FIG. 4 is a schematic diagram showing the signals for two adjacent column electrodes of FIG. 3B.

FIG. 4 is a schematic diagram showing the signals for two adjacent column electrodes of FIG. 3B. The encoded signal ES will be described hereinafter with sequential coding in time for one dimension touch input perpendicular to the row electrode as an example. Of course, this method can also be applied to another dimension touch input perpendicular to the column electrode. Consequently, a complete two-dimensional touch input can be built.

Figure 5:
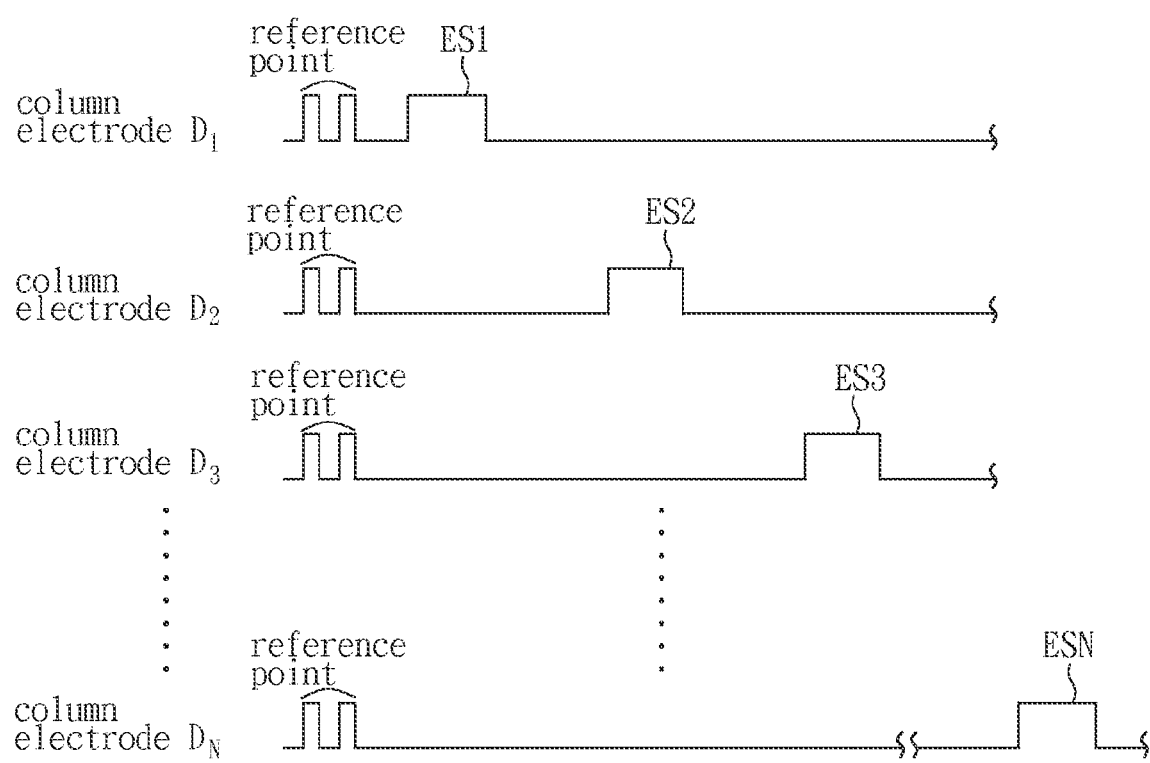
FIG. 5 is a timing chart of the encoded signal transmitted through each column electrode according to the first embodiment of the invention.

In this embodiment, as shown in FIG. 4, only one column electrode transmits the encoded signal ES, wherein the encoded signal ES is labeled with a level different from that of the display signal, or, in practice, the encoded signal ES and the display signal may have the same level. In other words, at a specific timing, the column electrode transmits an encoded signal ES1 and a display signal DS1, and at the next timing, the column electrode transmits another encoded signal ES2 and another display signal DS2. FIG. 5 is a timing chart of the encoded signal ES transmitted through each column electrode, wherein the display signals DS for display are omitted. Herein, the column electrodes $D_1 \sim D_N$ transmit the encoded signals ES1~ESN, respectively. To be noted, the encoded signals ES1~ESN can be transmitted through different column electrodes, respectively, or multiple column electrodes may transmit the same encoded signal. For example, the column electrodes $D_1 \sim D_3$ transmit the encoded signal ES1, and the column electrodes $D_4 \sim D_6$ transmit the encoded signal ES2. This approach may also be applied to the transmission of encoded signals ES through the row electrodes. Alternatively, the encoded signals ES transmitted through the row electrodes and the column electrodes may be an independent coding system, respectively. Since the column electrodes transmit the encoded signals ES sequentially, it is necessary to provide a time reference point for determining the positions of the column electrodes by comparing with the reference point. This reference point can be a specific code and transmitted by the same manner. For example, all column electrodes may output the code "1" twice and then transmit the sequential signal. As mentioned above, if the encoded signal ES coupled to the operation apparatus 11 is "110010000", it represents that the operation apparatus 11 is located on the third column electrode, thereby figuring out the coordinate (x-coordinate) of the operation apparatus 11. Similarly, the y-coordinate of the operation apparatus 11 can be estimated according to another encoded signal applied to the row electrode. Besides, the duty cycle of the encoded signal ES of this embodiment is smaller than that of the display signal DS, thereby maintaining the display quality.

The above modulation is carried out by amplitude modulation technology, which uses the high-low level of the amplitude for representing "1" and "0" digital signals. Or, it is also possible to use the frequency modulation technology for representing the "1" and "0" digital signals. For example, it can define that five oscillations within a unit time is "1", while other frequencies are all "0". Alternatively, it is also possible to use phase shift modulation technology for representing the digital signals. For example, it can define that one high level plus one low level represents "0", and one low level plus one high level represent "1". Herein, the applied modulation method is not limited. Besides, in order to prevent the interference of the neighbor electrodes, the technology of time division, frequency division or code division can be applied to different electrodes.

When a user grabs the operation apparatus 11 and operates it on the display surface 121 of the passive matrix display apparatus 12 (e.g. to contact or approach the display surface 121), the encoded signal ES is coupled capacitively from the passive matrix display apparatus 12 to the operation apparatus 11. This embodiment takes the column electrodes $D_1 \sim D_N$ for transmitting the encoded signals ES as an example, so the column electrode can serve as one of the capacitive coupling electrodes, and the operation apparatus 11 has the other capacitive coupling electrode. For example, when the operation apparatus 11 is a stylus, a conductor configured at the tip of the stylus functions as the other capacitive coupling electrode.

After receiving the encoded signal ES through the capacitive coupling, the operation apparatus 11 processes the received encoded signal ES to generate a transmission signal TS. This process includes amplifying and/or decoding the encoded signal ES so as to determine which column electrode is touched or pressed, or the touch position, or the touch gesture (writing style), or the corresponding function or instruction deduced from the input. To be noted, the encoded signal ES is capacitively coupled to the operation apparatus 11, and the value of the capacitance depends on the distance between the operation apparatus and the display surface 121, which means the amplitude of the signal can provide the z-axis information, so that the operation apparatus 11 can get not only the two-dimensional coordinates but also the z coordinate. Accordingly, the transmission signal TS may denote messages from simple amplification of the encoded signal ES to instructions of the action.

After generating the transmission signal TS, the operation apparatus 11 can transmit the transmission signal TS to the passive matrix display apparatus 12, other relay apparatus, or other apparatuses outside the visual interface system 1 through wire, or wireless, or electrical coupling (including capacitive or inductive coupling) or optical coupling. In this embodiment, the transmission signal TS is directly transmitted to the passive matrix display apparatus 12.

When this invention is applied to other non-touch input applications, the information to be transmitted is encoded to generate an encoded signal ES based on a specific coding rule, and then the encoded signal ES is capacitive coupled from the passive matrix display apparatus 12 (e.g. configured as a cell phone or tablet computer) to the operation apparatus 11 (e.g. short distance wireless reading apparatus attached on the wall). Similarly, the operation apparatus 11 can process (decodes or modifies) the encoded signal ES based on the preset coding rule so as to obtain the transmission signal TS, and then uses the transmission signal TS on the corresponding application such as access control, payment, financial transaction, file transmission, and the likes.

In the above embodiment, the operation apparatus 11 processes the encoded signal ES to obtain the information contained in the transmission signal TS such as the touch input information, instruction information, identification information, transaction information, file information or other information. In other embodiments, the passive matrix display apparatus 12 may process the transmission signal TS to obtain information, which contains the touch input information, instruction information, identification information, transaction information, file information or other information. The touch input information may include the relative position information of the operation apparatus 11 on the display surface 121, wherein this relative position information is a signal outputted from the first substrate 122 and the second substrate 123 of the passive matrix display apparatus 12.

As mentioned above, referring to FIG. 1, in the procedures of coupling the encoded signal ES to the operation apparatus 11 to generate the transmission signal TS and transmitting the transmission signal TS to the passive matrix display apparatus 12 to obtain the information, the signal is gone through the processes, for example, amplification and decoding, which can be handled by either one of the operation apparatus 11 and the passive matrix display apparatus 12 or among these units. The resulting transmission signal TS can contain the touch input information, instruction information, identification information, transaction information, file information or other information. The information obtained by the passive matrix display apparatus 12 may also contain the touch input information, instruction information, identification information, transaction information, file information or other information.

Besides, a response signal RS can also be transmitted between the operation apparatus 11 and the passive matrix display apparatus 12. Herein, the response signal RS is for providing the information of the receiving status of the operation apparatus 11 to the passive matrix display apparatus 12, or for announcing the operation apparatus 11 to get ready for receiving the signal, or synchronizing the operation apparatus 11 and the passive matrix display apparatus 12. This configuration can create an interactive mechanism between the transmitting and receiving signals. Moreover, the response signal RS can provide the synchronization function for establishing an information handshaking procedure between the operation apparatus 11 and the passive matrix display apparatus 12.

Figure 6:
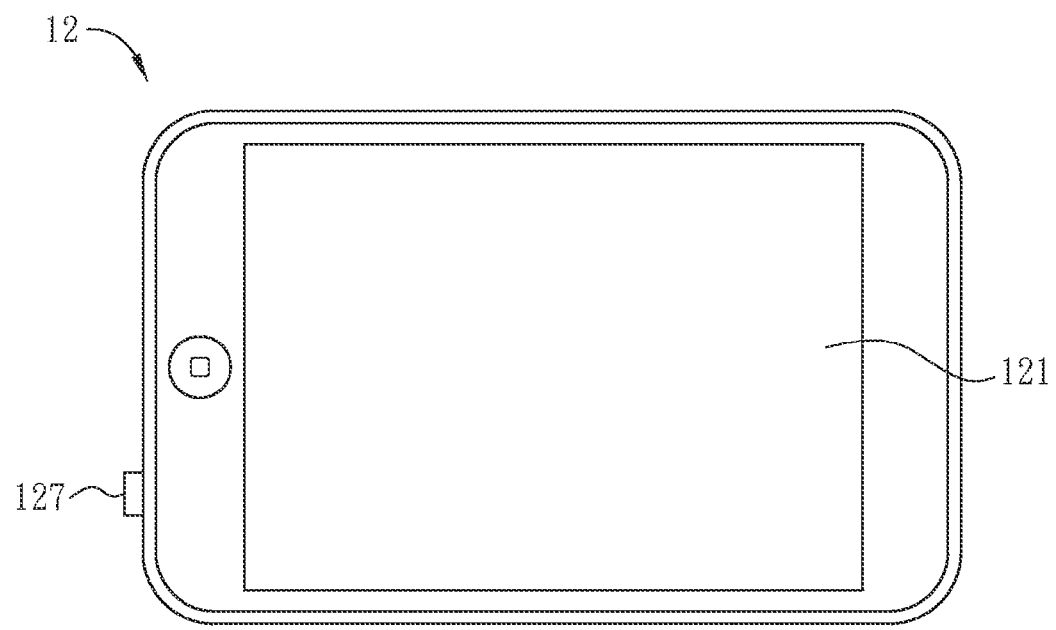
FIG. 6 is a perspective view of the passive matrix display apparatus according to the first embodiment of the invention.

FIG. 6 is a perspective view of the passive matrix display apparatus 12 according to the first embodiment of the invention.

Referring to FIG. 6, the visual interface system 1 further includes a mode trigger device 127. When a user or the operation apparatus triggers the mode trigger device 127, the mode trigger device 127 can enable the passive matrix display apparatus 12 into an operating mode to output the encoded signal ES. For example, when the user needs the touch input function, he/she activates the mode trigger device 127 (e.g. pushes the button) so as to enable the passive matrix display apparatus 12 into the touch input mode. Then, the row electrode or column electrode starts to transmit the encoded signal. Or, the passive matrix display apparatus 12 does not enter the touch input mode and the touch input function of the passive matrix display apparatus 12 may be partially or totally shut down. This function can save power and prevent the system to misinterpret the actions caused by unintentionally contacting the screen. To be noted, the operation of the mode trigger device 127 may have different operation modes. For example, after been activated, the mode trigger device 127 may remain in the new state for a while and then return to the original state, or it may change the state each time after being activated. Or, the mode trigger device 127 may remain in the new state only when the activation lasts. Besides, the mode trigger device 127 can be configured on the operation apparatus 11 (e.g. a switch on the stylus). In this case, when the mode trigger device 127 is activated, the operation apparatus 11 transmits a trigger signal to the passive matrix display apparatus 12 to enter the touch input mode. To be noted, the mode trigger device 127 can be triggered once or continuously for switching to the touch input function. Taking the access card, ticket, credit card or file transmission as examples, the user can trigger the mode trigger device 127 to transmit the encoded signal for authorization or personal identification to the corresponding data receiving device. The mode trigger device 127 can be, for example, a mechanical switch, a touch sensing switch, or the likes.

Figure 7:
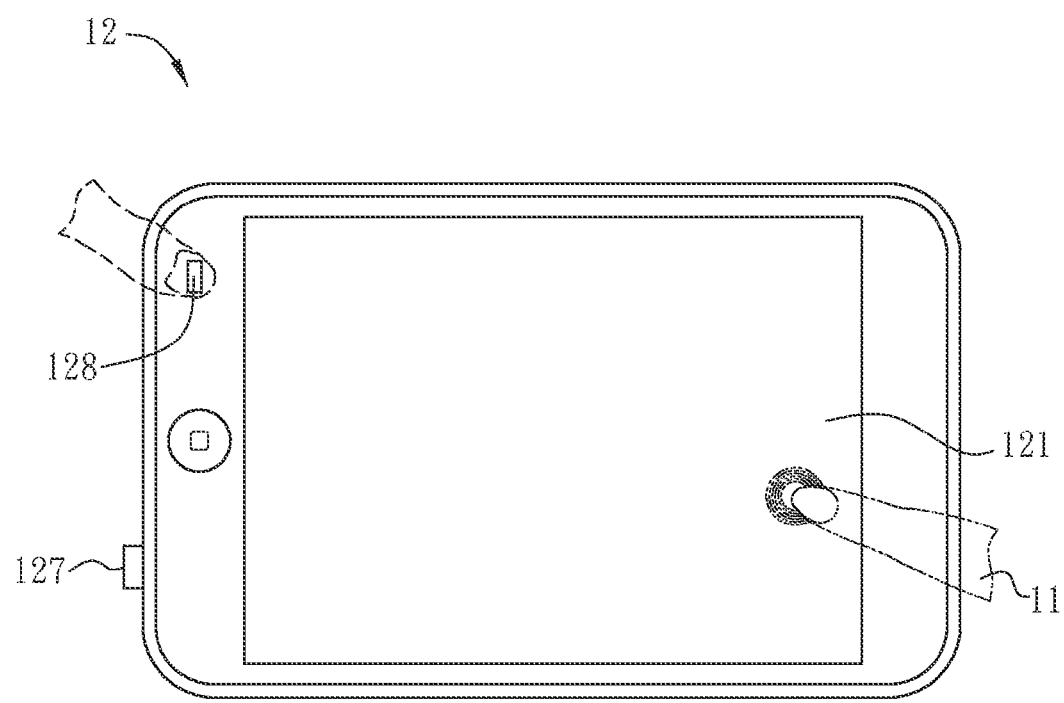
FIG. 7 is a schematic diagram showing the passive matrix display apparatus and a user, as the operation apparatus, according to the first embodiment of the invention.

FIG. 7 is a schematic diagram showing the passive matrix display apparatus 12 and a user, as the operation apparatus 11, according to the first embodiment of the invention.

In this aspect, the visual interface system 1 further includes a sensing device 128, which is electrically coupled with the passive matrix display apparatus 12. When the user touches or approaches the display surface 121 and the sensing device 128 of the passive matrix display apparatus 12 simultaneously, the transmission signal TS is transmitted to the passive matrix display apparatus 12. That is, the user serves as a large conductor for transmitting the transmission signal TS to the passive matrix display apparatus 12. In practice, the user can use his/her right hand to operate on the display surface 121, while use the left hand to press the sensing device 128. Accordingly, the encoded signal ES can enter the user body through the right hand, and the transmission signal TS can be outputted from the left hand. The transmitted information can be obtained by analyze the transmission signal TS received by the sensing device 128. The sensing device 128 may also contain the function of the mode trigger device 127. For example, only when the sensing device 128 is pressed by the left hand, the operation mode will be enabled. This specific function can sufficiently reduce the power consumption and the problem of unintentional touch.

Figure 8:
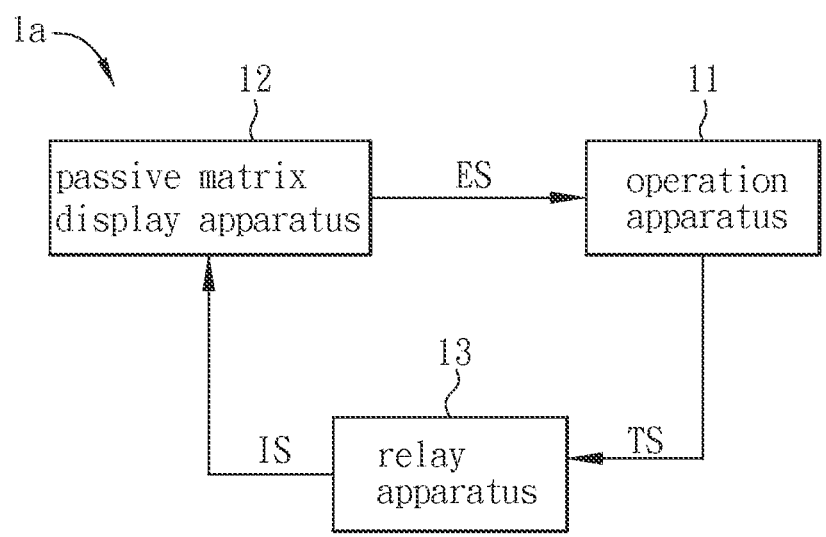
FIG. 8 is a block diagram of a visual interface system according to a second embodiment of the invention.

FIG. 8 is a block diagram of a visual interface system 1a according to a second embodiment of the invention.

The visual interface system 1a includes an operation apparatus 11 and a passive matrix display apparatus 12.

Different from the first embodiment, the visual interface system 1a further includes at least one relay apparatus 13, and the transmission signal TS is transmitted to the passive matrix display apparatus 12 or other apparatuses outside the visual interface system 1a through the relay apparatus 13. In this aspect, the user's hand is used to transmit the transmission signal TS to the relay apparatus 13, and a relay processed signal IS generated by processing the transmission signal TS is then transmitted back to the passive matrix display apparatus 12. This aspect is only for illustrations and, of course, it is possible to configure multiple relay apparatuses. Besides, when the operation apparatus 11 is a user, the user can transmit the transmission signal TS to the relay apparatus 13, wherein the signals are not transmitted back to the passive matrix display apparatus 12. Herein, the relay apparatus 13 can be a portable communication device such as a cell phone. Accordingly, the user can be the transmission media for conducting the encoded signal ES outputted from the passive matrix display apparatus 12 to the relay apparatus 13 in order to transfer the file information.

The relay apparatus 13 can process the transmission signal TS to generate a relay processed signal IS and then transmit the relay processed signal IS to the passive matrix display apparatus 12. In the procedures of coupling the encoded signal ES to the operation apparatus 11 to generate the transmission signal TS, processing the transmission signal TS by the relay apparatus 13 to generate the relay processed signal IS, and transmitting the relay processed signal IS to the passive matrix display apparatus 12 to obtain the information, the signal is processed by, for example, amplification, decoding, modifying and/or interpretation, which can be implemented by either one of the operation apparatus 11, the passive matrix display apparatus 12 and the relay apparatus 13 or among these units. Accordingly, the transmission signal TS or the relay processed signal IS can contain the touch input information, instruction information, identification information, transaction information, file information or other information.

Besides, the response signal RS of the first embodiment can also be applied to the operation apparatus 11, and/or the relay apparatus 13 and/or the passive matrix display apparatus 12 of the second embodiment, thereby creating an interactive mechanism between the transmitting and receiving signals. Moreover, the response signal RS can provide the synchronization function for establishing an information handshaking procedure between the operation apparatus 11, the relay apparatus 13 and the passive matrix display apparatus 12.

In the visual interface system of the invention, when the operation apparatus is operated on the display surface of the passive matrix display apparatus, the encoded signal is coupled to the operation apparatus from the passive matrix display apparatus, and the operation apparatus receives the encoded signal to generate a transmission signal. In the example of touch input operation, the transmission signal can be directly or indirectly transmitted to the passive matrix display apparatus. During this transmission procedure, the transmission signal can be processed by the operation apparatus, and/or at least one relay apparatus, and/or the passive matrix display apparatus, so that the passive matrix display apparatus can retrieve the information (e.g. touch input information, instruction information, identification information, transaction information, file information or other information) contained in the encoded signal and transmission signal.

As mentioned above, the visual interface system of the invention can be directly applied to the system containing the passive matrix structure such as passive matrix LCD apparatus, non-volatile type display apparatus, touch input display apparatus, passive matrix OLED display apparatus, or the likes, thereby integrating display, touch input and data transmission functions together. Thus, the manufactured products can be lighter and thinner and the product cost can be reduced, thereby improving the product competitiveness. Moreover, the encoded signal is coupled to the external operation apparatus instead of being directly read by the passive matrix display apparatus, so that it is unnecessary to modify the layout on the passive matrix display apparatus. For example, regarding to the touch input application, it is unnecessary to add the capacitance sensing component in the display panel for detecting the change of external capacitance values. As a result, the present invention can decrease the manufacturing cost and time.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A visual interface system, comprising:
an operation apparatus; and
a passive matrix display apparatus, comprising:
a first substrate;
a display surface located at a first side of the first substrate; and
a second substrate disposed opposite to the first substrate and located at a second side of the first substrate relatively opposite to the first side;
wherein, when the operation apparatus is operated on the display surface of the passive matrix display apparatus, an encoded signal is coupled to the operation apparatus from the passive matrix display apparatus, and the operation apparatus receives the encoded signal to obtain a transmission signal;

wherein the passive matrix display apparatus has a plurality of electrodes disposed on the first substrate or the second substrate, and the encoded signal is applied to the electrode and is then capacitively or inductively coupled to the operation apparatus from the electrode, the encoded signal includes a reference time to identify the electrode that transmits the encoded signal.

2. The visual interface system of claim 1, wherein the transmission signal is transmitted to the passive matrix display apparatus.

3. The visual interface system of claim 1, wherein the passive matrix display apparatus processes the transmission signal to obtain information comprising touch input information, instruction information, identification information, transaction information, or file information.

4. The visual interface system of claim 3, wherein the touch input information includes relative position information of the operation apparatus on the display surface, and the transmission signal is outputted from the first substrate and the second substrate.

5. The visual interface system of claim 1, further comprising:
at least a relay apparatus for processing the transmission signal to generate a relay processed signal.

6. The visual interface system of claim 5, wherein the relay processed signal is transmitted to the passive matrix display apparatus.

7. The visual interface system of claim 5, wherein the transmission signal comprises touch input information, instruction information, identification information, transaction information, or file information.

8. The visual interface system of claim 5, wherein the relay processed signal comprises touch input information, instruction information, identification information, transaction information, or file information.

9. The visual interface system of claim 6, wherein the passive matrix display apparatus processes the relay processed signal to obtain information comprising touch input information, instruction information, identification information, transaction information, or file information.

10. The visual interface system of claim 1, further comprising:
a mode trigger device for enabling the passive matrix display apparatus into an operating mode to output the encoded signal when the mode trigger device is triggered by a user or the operation apparatus.

11. The visual interface system of claim 1, wherein when the operation apparatus is a user, the visual interface system further comprises a sensing device, and then when the user touches the display surface and the sensing device simultaneously, the transmission signal is transmitted to the sensing device.

12. The visual interface system of claim 11, wherein the sensing device has a mode trigger function, so the sensing device enables the passive matrix display apparatus into an operating mode to output the encoded signal as the user touches the sensing device.

13. The visual interface system of claim 1, wherein the passive matrix display apparatus further comprises a display medium layer disposed between the first substrate and the second substrate.

14. The visual interface system of claim 1, wherein the encoded signal is transmitted as the display screen of the passive matrix display apparatus is renewing or between the renewals of the display screen of the passive matrix display apparatus.

15. The visual interface system of claim 5, further comprising:
a mode trigger device for enabling the passive matrix display apparatus into an operating mode to output the encoded signal when the mode trigger device is triggered by a user or the operation apparatus.

16. The visual interface system of claim 5, wherein when the operation apparatus is a user, the visual interface system further comprises a sensing device, and then when the user touches the display surface and the sensing device simultaneously, the transmission signal is transmitted to the sensing device.

* * * * *